Feb. 21, 1961 G. UPTON, JR 2,972,527
ABRASIVE PRODUCTS AND METHOD OF MAKING
Filed March 3, 1959 3 Sheets-Sheet 1

ADIPIC ACID + DIETHYLENE GLYCOL → DIETHYLENE GLYCOL MONOADIPATE
LINEAR POLYESTER

Fig. 1

DIETHYLENE GLYCOL ADIPATE POLYMER

Fig. 2

INVENTOR.
George Upton, Jr.
BY
Howard R. Savage
ATT'Y

Feb. 21, 1961

G. UPTON, JR 2,972,527

ABRASIVE PRODUCTS AND METHOD OF MAKING

Filed March 3, 1959

$$R\text{-}OH + O=C=N\text{-}R' \rightarrow R\text{-}O\overset{O}{\underset{\|}{C}}\text{-}\overset{H}{\underset{|}{N}}\text{-}R'$$

REACTION OF HYDROXYL WITH ISOCYANATE $$R\text{-}\overset{O}{\underset{\|}{C}}\text{-}OH + O=C=N\text{-}R' \rightarrow R=\overset{O}{\underset{\|}{C}}\text{-}\overset{H}{\underset{|}{N}}\text{-}R' + CO_2$$

REACTION OF CARBOXYL WITH ISOCYANATE

TYPICAL ISOCYANATE REACTIONS

*Fig. 3*

$$2\left[HO(R)OH\right] + R'(N=C=O)_2 \rightarrow R'\left\{\overset{H}{\underset{|}{N}}\text{-}\overset{O}{\underset{\|}{C}}\text{-}O(R)OH\right\}_2$$

WHERE:

R = GLYCOL ADIPATE POLYMER, (FIGURE 2)
R' = ARYL GROUP OF AN ARYL DIISOCYANATE

POLYMER - DIISOCYANATE REACTION

*Fig. 4*

INVENTOR.
George Upton, Jr.
BY
*[signature]*
ATTY

Feb. 21, 1961 G. UPTON, JR 2,972,527
ABRASIVE PRODUCTS AND METHOD OF MAKING
Filed March 3, 1959 3 Sheets-Sheet 3

INVENTOR.
George Upton, Jr.
BY
ATTY

United States Patent Office 2,972,527
Patented Feb. 21, 1961

2,972,527
ABRASIVE PRODUCTS AND METHOD OF MAKING

George Upton, Jr., Hingham, Mass., assignor to Chemical Research Corporation, Rockland, Mass., a corporation of Massachusetts Filed Mar. 3, 1959, Ser. No. 796,854

8 Claims. (Cl. 51—298)

This invention relates to an improvement in the bonding of discrete particles or grains of abrasives and to a new class of integral abrasive products which are of new properties and capable of new functions, accordingly, upon the surfaces of work to be operated upon therewith.

In the prior art, abrasive products have been developed beyond the scope of natural abrasive stones and loose granular materials, largely in terms of the compositions and properties of the abrasive grain materials and the bonding of the latter, either by embedding them in a more or less friable matrix or adhesively applying the abrasive grains to flexible surfaces, such as paper, cloth and the like, with friable adhesives. In the case of the integrated, solid, bonded abrasives, the bond may be hard or soft, but unyielding except by fracture. In the coated papers or fibrous materials, as backing materials, such as cloth, adhesion of the abrasive grains is not so strong, more or less flexible, but brittle.

In such products and practices of the prior art, the path and traverse of the work and of the abrasive surface have been positive, both in space (in two dimensions) and in speed. Likewise, it has usually been imperative that the position of the abrasive surface and of the surface to be operated upon, or the work, be positively determined and that the rate and degree of feed of the one and the position, guide and movement of the other shall be accurately related, at all times, in order to get satisfactory coordination, accurate operation and results.

By the present invention, such co-ordinated relationship between the abrasive or polishing unit on the one hand and the surface or work to be operated upon, on the other, may be just as accurately provided and maintained during operation. But the dependence of the one upon the other, for satisfactory and accurate results, has been overcome.

Abrasive products, as heretofore developed, are inherently hard and thus have the great disadvantage, more particularly on free-hand work, of leaving chatter marks. Various attempts have been made to overcome this defect. There are rubber bonded wheels but these are only relatively soft and produce chatter to only a lesser degree. Moreover such wheels are limited as to their softness and do not withstand the heat of attrition, which is evidenced by odor and the deposit of the bond upon the work. Relatively soft wheels have been made by combining soft type resins with a reinforcing fabric and with the abrasive grain impregnated in the matrix of the fabric and bond. These wheels too are also relatively hard and slow in cut. The latter action in particular is due to the relatively low level of grain concentration in the finished article.

I have made the discovery and invention that by dispersing abrasive grains in a labile, continuous homogeneous liquid, of low viscosity and surface tension, which is characterized by containing reagents capable of subsequent polymerization to form an elastomer therefrom, with concomitant evolution of a gas, the resulting dispersion intimately and completely wets the surfaces of each abrasive grain and, upon effecting such polymerization reaction, continues to retain the brasive grains dispersed in the labile, reactant liquid, throughout its reactions and until it sets in the form of a foam structure, of thin, elastomeric films. The dispersed grains are embedded and retained, uniformly spaced and distributed through the whole, to present a continuous system of thin elastic films, forming an elastic matrix and a tough, long-wearing abrasive-polishing medium. The product may be shaped to such conformations, sizes and shapes as may be desired and of controllable density, hardness, abrasive grain size or sizes, concentration and action, in terms of the work to be performed by it. Such abrasive products are consequently of ready adaptability to a wide variety of conditions of use, in terms of the shape, character, hardness and composition of the abrasive surface and of the surfaces to be abraded, polished, or otherwise finished therewith.

It may be pointed out that while such reactive mixtures of this invention, characteristically producing foam from the self-contained, dissolved reactants in the liquid from which the film forming polymerization is to take place, may be thus molded and freely and accurately removed from metal molds, without difficulty, it is also found that they can nevertheless be applied to suitable backing materials, such as paper, cloth and the like, and that they are capable of wetting such surfaces intimately and adhering thereto during the reaction and also of developing such adherent bonding union, in the finished, polymerized or set condition, so as to form corresponding abrasive-coated products which are firmly integrated and wholly satisfactory for use in this form, and at the same time manifest all of the unique properties of the molded abrasive products of the invention.

The invention will be described with reference to the use of a polyurethane resin such as may be formed by reaction of a polyester and/or polyether with a di-isocyanate or poly-isocyanate or other resin, of the type which upon the addition of or release of the catalyst generates foam, as a binder for abrasive or polishing agents. Such bonded articles may be made in the form of wheels, points, and a wide variety of shapes, and the like, and of adaptations to the purposes in view, including coated abrasive products, as above mentioned.

I have found that a polyurethane resin, such as one made by reacting a polyester of adipic acid and ethylene or propylene glycol, esterified and polymerized to a molecular weight of approximately 2000, more or less, with a di-isocyanate, gives novel results when catalyzed and handled as I shall describe hereinbelow, to produce abrasive and polishing wheels and the like.

Advantage is utilized of the foam-producing reaction procedure to produce a tough and resilient product which may also be varied widely in hardness. This hardness may be controlled as I shall describe. The foam process provides a high degree of wetting of the grain (which is essential to well bonded products of this type) which phenomenon can as desired permit high or low ratios of filler or mineral grains to resin content. The reactive process is taken advantage of also to produce the high degree of uniform dispersion that is essential in such products.

A further advantage accruing from the use of this type of resin is the ability to "tailor" the catalysts and their handling so that a relatively slow or rapid reaction may be obtained, as may best suit the needs of pouring or handling of a particular mix. In addition to such control, I have found that the temperature of the mold or other forming device, the temperature of the abrasive grain admix and the temperature of the resin, as well as the effective temperature of the composite, labile fluid mixture, may all be varied, to effect control, as well as the incipient and applied pressure in the mold, during the reaction. All have individual effects on the nature of the finished product. Variations of these factors singly or in conjunction with each other are all controllable within reason and contribute materially to objective results. These variables may be practically resolved to produce products molded or cast and set on a production schedule which permits release and re-use of the mold or form within a relatively short time, in many instances, ten minutes.

Figure 1:
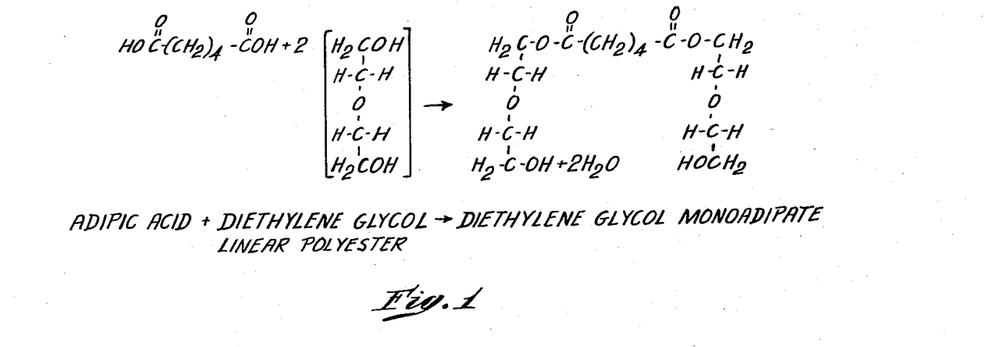
Figure 2:
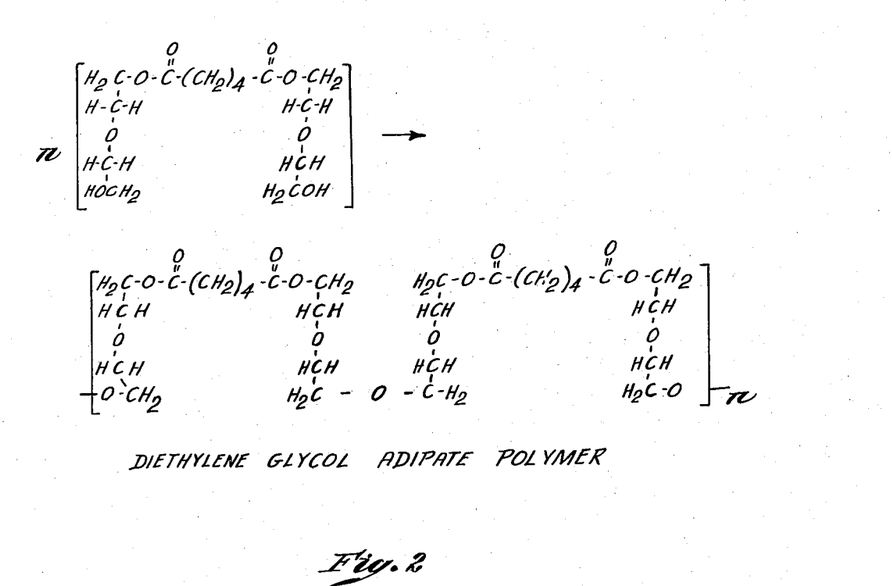

In the following representative examples of my invention, the bonding composition was prepared from an adipic acid diethylene glycol ester, reacted and polymerized to a molecular weight of 2000, more or less, and having two hydroxyl radicals to the molecule. A diagram showing a formation and molecular structure of such resin is given in Fig. 1 and the polymerization of the same in Fig. 2.

Figure 3:
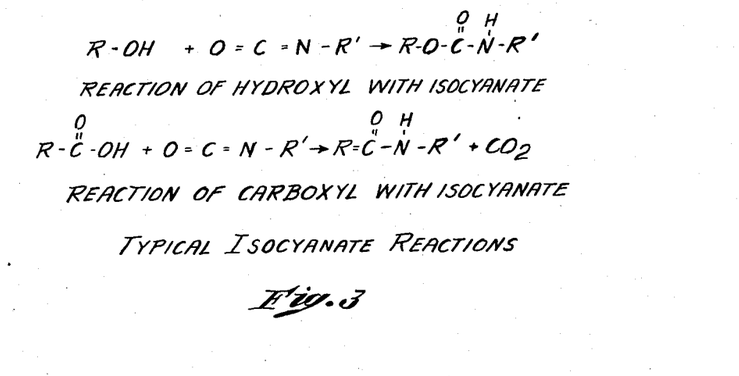

This resin was then reacted with an aryl isocyanate, such as toluene di-isocyanate, to form a urethane linkage and simultaneous reaction with carboxyl radicals of the diethylene glycol ester of adipic acid, thereby to liberate carbon dioxide gas, as illustrated by the reaction shown in Fig. 3, and effect the foaming procedure by concomitant reaction of the continuous, homogeneous, liquid reaction mixture.

The molecular weight to which the polymerization of the resin is carried may be varied, as above mentioned, to effect a corresponding variation in the rate and degree of the reactions to be effected, the physical properties of the mixture during its preparation and reaction, and the formation and characteristics to be developed in the ultimate product to be obtained. This also applies to the degree of hydrolysis, or number or proportion of hydroxyl radicals in the resin polymer as prepared and used.

Figure 4:
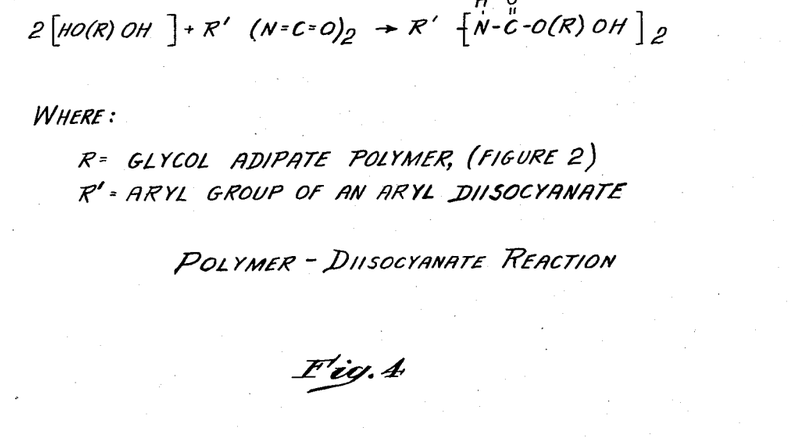

The combination of the diethylene glycol adipic acid ester polymer, with the aryl isocyanate, is illustrated by the reaction set forth in Fig. 4.

The reaction and polymerization of these reagents is exothermic and hence the temperature of each reagent and of the mixture and of the mixing vessel and mold into which the reaction mixture is to be poured should be considered and regulated accordingly. But the reaction may also be regulated and controlled by varying the type and amount of a catalyst and by the rate and degree and time of mixing, before adding the abrasive, and after pouring as, for example, before closing the mold, and of applying supplementary pressure to the reaction mixture, if that is to be done.

As the labile, polymerizing and preferably spontaneously foaming resin composition develops the degree of activity and viscosity desired, the abrasive grain is added and dispersed rapidly, completely and uniformly therethrough, whereupon the individual particles or grains become completely wetted throughout the surfaces of each discrete, separate grain. And each grain thereupon goes into the interface of the homogeneous liquid, thin films of the labile, polymerizing liquid reaction mixture, in the form of bubbles or foam, being thus further dispersed and retained and maintained in such association, as the liquid film-resin structure sets and becomes a solid foam.

The labile and reacting resin polymer is liquid during such operations and as soon as the abrasive grains have been dispersed therein the mixture may be cast, molded, sheeted or otherwise shaped and brought to the dimensions or given other characteristics that may be required or desired, with or without any pressure. If pressure is applied, this tends to restrain and to reduce the bubble size of the foam structure and thus produce a finer texture and product, as well as one of less volume and a consequently greater density. The pressure may be that effected by using simply a closed mold, as inherently developed by the liberation of the gas and the foaming reaction of the mixture, or superposed additional and/or released pressures may be applied and maintained until the reaction is completed and the mixture has solidified.

I have found that the ratio of resin to grain may usefully range from less than 1 to 1 to more than 1 to 7, by weight. This wide range is cited because the fact that governs wetting is that of surface area, given a liquid bonding composition which is capable of specific wetting of the abrasive grain surfaces. Therefore as it is obvious that this composition is of use in conjunction with particles of widely different size (and therefore of surface area to weight ratio) so must the ratio of bond to weight of the mineral particles vary. The ratio of bond in the case of coarse grains is low and in the case of fine sizes is high. As regards the ratio of grains to bond there is no low limit as utility in the form of a burnish finish is obtained from use of a composition so made which contains no abrasive mineral. Naturally from this type of composition any addition of grain up to the maximum increases the abrading characteristics of the product.

Control of the formation of the product and the development of its characteristics is of course first dependent upon the exact type of resin composition and catalyst employed. Beyond this, the control factors are temperature, as applied to the resin, mineral, mixture and mold, and pressure, either externally applied to the molded mixture, or utilized as resulting from the reaction itself, or both. In a confined mold the reacting resin produces a pressure as high as thirty pounds per square inch. For this reason the amount of material relative to the cubic volume of the mold determines the size of the foam formed and thus the density of the product. This, of course, is in terms of the quantity of material actually charged into the mold and the volume of the foam and integrated product formed therefrom, and not the quantity of reactive mixture or material prepared. This may seem to be obvious, but the consistencies of such mixtures are such that the reactive batch, as prepared and ready for molding, may vary easily be considerably in excess of that actually transferred to and distributed in the mold cavity, before closing it. The density is also susceptible to variation and control, separately, by varying the ratio of the abrasive grain to the resin bond used in the mixture.

If external pressure is applied to the mold in excess of the internal pressure and is held beyond a critical stage in the gelation process, the internal pressure is overcome, and then, if the mold is vented there will result a composition of extremely high density and hardness and with a minimum of foam structure. If, on the other hand, the external pressure is released prior to gelation and the mold expansion is controlled and retarded there will result a structure with an extremely fine bubble size and a wheel or other shape of abrasive product which, although hard by any standards, still possesses a degree of resiliency not found in such products as now known to the art.

Temperature of the mold is preferably keyed to the temperature of the reacting material, as poured. This gives the greatest uniformity of product. Varying of this temperature in certain shapes and sizes of product may be of advantage. That is, chilling of the mold will aid the pouring and blending of the mixture when a large shape is being made, whereas heating will not hinder and will speed up the process as far as smaller shapes are concerned.

Temperature of the mineral grain and base resin are accordingly controlled in order to facilitate handling of the reactive mix from the mixing vessel to the mold or to the sheeting or coating operations, as the case may be. Control of base resin temperature is also a factor which aids in the control of viscosity and of uniformity of wetting the abrasive grains. Thus with the resins described a temperature below 70° F. would retard the wetting less critically in the case of the very coarsest grades and more critically as the grains employed became finer. Temperatures above 120° F. are not practical except with very small amounts as they promote a reaction too fast to handle. The foregoing reference is meant to be construed to apply to resin temperature control only.

Temperature control of the abrasive or polishing agent before introduction to the mix is of great importance. The control must be keyed so as to obtain good wetting (because mineral temperature will affect the viscosity of the resin as it is being mixed) as well as direct control of the reaction so as to allow time for reaction, mixing, pouring and spreading. These factors are not incompatible (as might appear) because of the different surface areas that must be provided for and handled. For instance, with the medium to coarse grades (16 to 100 mesh) it is an advantage to use the mineral at low temperatures (from 20° to 70° F.). This is because in this range of mineral sizes the surface area to the weight ratio of the grain is not high—the wetting is fast since the reaction is less inhibited. The use of temperature control, even as low as 20° F., is essential to provide time for mixing and handling.

When employing the finer grades and higher concentrations, the problem is to promote the foaming action so as to insure complete wetting and dispersion of the abrasive grains in the reaction mixture. In such cases, grain temperatures as high as 150° F. may be safely and usefully employed. Again, the bond to mineral abrasive ratio is also a governing factor. This control was developed and proved as a result of the observation that in sufficient wetting or poor dispersion of the mix resulted from excessive distribution of the resin which did not permit sufficient and efficient foaming of the composition. Temperature control of the grain is therefore essential.

In practice, the catalyst is introduced into the resin and by means of a variable speed mixing head is uniformly distributed. In order to promote uniformity, the grain is not introduced until the foaming has started to become apparent. This promotes the wetting of the abrasive grains, individually and completely, through the action of heat, low viscosity, distribution throughout the entire volume of the mix, extensive film formation of the labile, reacting and polymerizing bonding component, the formation of bubbles of gas throughout the whole, and the development of the maximum surface area of the liquid. Agitation is continued until all of the grains have been introduced and wetted thoroughly, when the operation is stopped and pouring of the mixture into the mold, or other shaping operation, is carried out expeditiously and immediately.

There are many control advantages in the procedure as described. However, it is contemplated that such mixing can be accomplished in an automatic mixing head, such as commonly used in the manipulation of foams. However, as with the hand mixing, the introduction of the grain would be delayed until after the foaming action starts and this does presuppose a two-stage mixing head.

Although the finished product may have the appearance to the layman of a rubber product, it is to be emphasized that what is accomplished here is not possible with rubber. The end result here is a foam of higher tensile strength and greater toughness, as well as heat resistance. Moreover, it is known that rubbers in the foaming stages do not possess the wetting abilities of the resins of this invention. Foaming in rubber mixes must be induced mechanically and/or by the extraneous introduction or formation of a gas, whereas this invention utilizes and provides for the characteristics of the resin formation and polymerization reactions, spontaneously and inherently to generate the gas, from the homogeneous, labile, liquid reaction matrix, per se.

Because the material is an elastomer and subject to elongation under stress, as at high speeds, the softer types will expand in the usual abrasive and polishing operations due to centrifugal force. Likewise, they will contract and return to their normal dimensions and shapes, when such stresses and strains are released. Such expansion and correlative contraction may be controlled within practical limits, if desired, by using the product as an outer layer or covering on a drum or sleeve, expansively held, as is common in such situations. Thus an outside layer, on a core of stronger material, of an inch or two inches in thickness, will permit higher speeds than would be desirable with a wheel of like dimensions, made entirely of the elastic bonded abrasive product of this invention.

A similar effect may also be achieved by the introduction of fine flock or fibers into the foam, in conjunction with the addition of the abrasive material. This then serves to strengthen the wheel or other shape against the stress and strain of high peripheral speeds of operation.

In accordance with the foregoing described procedures, the following typical and representative examples of the invention were carried out, resulting in the obtainment of satisfactory products, of the properties set forth in connection with each, and useful for application to usual abrasive and/or polishing operations and upon various kinds and conditions of surfaces of work to be operated upon.

In the procedure for performing the examples—the amount of resin is weighed as also are the amounts of the other ingredients. The resin and mineral are then brought within the specified temperature range.

A container is charged with the resin and mixing is started slowly, the catalyst is added to the mix under agitation and the speed of mix is increased so that the catalyst is rapidly and uniformly dispersed in the resin. As soon as the catalyst is introduced the mineral container is readied. Introduction of the mineral is withheld until it is seen that the reaction has started and at this moment the mineral is introduced into the vortex caused by the mixing head. The speed with which the mineral is introduced is keyed to the generation of the foam so that all particles may be uniformly wet and dispersed. Too slow an introduction of mineral permits the reaction to get out of hand and beyond mixing or control; too fast a rate of introduction may result in un-uniform wetting and thus a mix that is not uniformly reactive.

At such time (and with the aid of a variable speed drive on the mixer) as the mix is seen to be uniformly wet and before the reaction is proceeding vigorously the reacting contents are then spread or poured or distributed as may be required for the particular object being manufactured. In those cases where a confined mold is to be employed the rate of pour must be keyed to the rate of advancing reaction or foam, so that the mold may be uniformly charged. As a part of the same operation it is preferable that the procedure be so conducted that the final closure of the mold coincides with that point where little or no air space remains in the mold.

At such time as the mold is closed it is made secure, either so as to define the volume of the finished product or so as to be ready to receive supplemental pressure if such is to be used, or permit subsequent expansion of the charge, in the closed mold, if this is desired.

Time for completion of reaction and firm gelation of the mix is a variable depending upon factors of mass reaction temperature, catalyst, etc. However, rarely in this period in excess of 15 minutes at the end of which time the mold is discharged and readied for re-use.

At the time the finished article is withdrawn from the mold a further period of cure is advisable before the composition is ready for use. This may be accomplished by an over cure at 200° F. for 16 hours, or a longer or shorter period dependent upon temperatures.

In the preparation of the examples cited, the base resin used was such as supplied by Barrett Division of Allied Chemical Company as Plaskon P.F.R. No. 5.

D.M.E. and morpholine are nomenclatures describing the following formulas used as catalysts:

D.M.E.:
    60 parts H₂O
    40 parts Tween #80 wetting agent
    10 parts di-methyl-ethanolamine Morpholine:
    42 parts H₂O
    21 parts Tween #80 wetting agent
    42 parts morpholine

*Example #1*

150 grams resin at 70° F.
450 grams #80 mesh aluminum oxide mineral at 60° F.
    5 grams D.M.E.
    6 grams morpholine Mixed and poured into a confined mold to make a wheel 8" diameter by 1½" face.

Density: 7.5 grams per cubic inch (.458 gram per cubic centimer)
Hardness: 20 Shore scale

*Example #2*

225 grams resin at 88° F.
675 grams #80 mesh aluminum oxide mineral at 62° F.
    9 grams D.M.E.
    9 grams morpholine Mixed and poured into a confined mold to make a wheel 8" diameter by 1½" face.

Density: 10.5 grams per cubic inch (.641 gram per cubic centimeter)
Hardness: 35 Shore scale

*Example #3*

250 grams resin at 80° F.
750 grams #80 mesh aluminum oxide at 63° F.
    10 grams D.M.E.
    10 grams morpholine Mixed and poured into a confined mold to make a wheel 8" by 1½".

Density: 12.3 grams per cubic inch (0.750 gram per cubic centimeter)
Hardness: 50 Shore scale

*Example #4*

200 grams resin at 75° F.
600 grams #80 mesh aluminum oxide at 40° F.
    8 grams D.M.E.
    8 grams morpholine Mixed and poured into a mold with a tight fitting but movable top, 8" diameter. Top subjected to a pressure of 90 pounds per square inch. Finished wheel 8" diameter by 1" face.

Density: 14.8 grams per cubic inch (.903 gram per cubic centimeter)
Hardness: 57 Shore scale

*Example #5*

200 grams resin at 80° F.
600 grams #80 aluminum oxide sand at 40° F.
    8 grams D.M.E.
    8 grams morpholine Handled in same procedure as #4 except pressure in the order of 200 pounds per square inch applied. Finished wheel 8" diameter by ¾" face.

Density: 19.6 grams per cubic inch (1.196 grams per cubic centimeter)
Hardness: 70 Shore scale

*Example #6*

300 grams resin at 70° F.
900 grams #80 aluminum oxide sand at 40° F.
    12 grams D.M.E.
    12 grams morpholine Handled in same procedure as #4 except pressure in the order of 350 pounds per square inch applied. Finished wheel 8" diameter by ¾" face.

Density: 29.8 grams per cubic inch (1.818 grams per cubic centimeter)
Hardness: 98 Shore scale

*Example #7*

200 grams resin at 70° F.
400 grams #180 aluminum oxide sand at 85° F.
    8 grams D.M.E.
    8 grams morpholine Mixed and poured into a confined mold to make a wheel 8" diameter by 1" face.

Density: 7.2 grams per cubic inch (.439 gram per cubic centimeter)
Hardness: 45 Shore scale

*Example #8*

235 grams resin at 80° F.
705 grams #180 aluminum oxide at 85° F.
    8.5 grams D.M.E.
    8.5 grams morpholine Mixed and poured into a confined mold to make a wheel 8" diameter by 1½" face.

Density: 10 grams per cubic inch (.610 gram per cubic centimeter)
Hardness: 55 Shore scale

*Example #9*

150 grams resin at 102° F.
750 grams #24 grit aluminum oxide mineral at 60° F.
    6 grams D.M.E.
    6 grams morpholine Mixed and poured into a confined mold to make a wheel 8" diameter by ¾" thick.

Density: 21.8 grams per cubic inch (1.330 grams per cubic centimeter)
Hardness: Approximately 45 Shore scale (due to the large grain size relative to bonding areas the Short type of measure is an approximation only on products of this type)

*Example #10*

200 grams resin at 80° F.
600 grams #80 aluminum oxide sand at 55° F.
    8 grams D.M.E.
    8 grams morpholine Mixed and poured into confined mold to make wheel 8" diameter by 1½" face.

Density: 7.7 grams per cubic inch (.470 gram per cubic centimeter)
Hardness: 20 Shore scale

*Example #11*

Same proportions and temperatures #10. Mixed and poured into confined mold to make a wheel 8" by 1" face.

Density: 18.6 grams per cubic inch (1.135 grams per cubic centimeter)
Hardness: 60 Shore scale One of the unique results of the invention described is the finish that is imparted to the workpiece as abraded by such abrasive products. The finish received is (grit size for grit size) very much finer than that obtained by use of either the conventional grinding wheel or surface coated abrasive. A characteristic phenomenon is a removal of stock (albeit at a slower rate), which leaves a polished finish rather than a scratch finish. This phenomenon I have observed is due to the even dispersion of the grain throughout the structure, with each particle individually coated and cushioned in a free film of elastic bond, as a result of the chemically controlled foaming, settling and polymerizing process. The result is a composition that is elastic as a whole and in the individual bonding films and is exceedingly tough, wherein the resin foam cushions the grain action in all three dimensions and acts to control the penetration of the grain or polishing particle into the surface of the work.

A further advantage of such a wheel structure is that it may be readily dressed or contoured to a particular shape or radius. This is accomplished by the use of a coarse (such as a No. 40 grit, for example) open coat resin bonded coated abrasive cloth in the shape of the desired contour. In practice this is held against the moving periphery of the wheel so as to contour the same.

Attributable further to the characteristic of the process described and to the novel and unique properties of this new class or type of abrasive products, is the fact that a wheel so made does not load or fill as do the harder and conventional wheels or coated abrasive products. It is evident that the constant flexing of the bonding film in three dimensions, in the abrasive operations of use, and under the pressure of work constitutes an action which throws out and prevents packing of work particles which load either a conventional wheel or surface coated abrasive. Despite this flexing the grains are so securely held that they remain fixed although free to give—either until finally pulled from their sockets by wearing of the bond or until the wheel is dressed. In any case, the wear is not rapid and the finish remains constant between dressings.

The speed of cut, when employing a single grit size, is controlled by the factor of hardness and grain concentration. In all cases the weight of the grain is at least equal to the weight of the elastic bond. Finish also will vary with hardness. Therefore finish, cut and hardness are influenced by the ratio of mineral abrasive grain to bond, as well as texture of composition which is here dependent upon and controlled by catalyst, temperature and pressure, as above described. For instance, a wheel with a density of 7.7 grams per cubic inch had a hardness of 20 or less on the Shore scale of hardness (as cited in Example #10), whereas a wheel of a density of 18.6 grams per cubic inch had a hardness of 60 or more, by the Shore scale, as cited in Example #11.

Both wheels cited above were made with a ratio of 600 parts by weight of mineral abrasive grain (80 mesh grit aluminum oxide) to 200 parts of resin and with the same catalyst and amount of the same. The former wheel is so soft as to permit the easy polishing of contoured shapes and will conform to fillets and the like without cutting deeply on the edges of the wheel. The latter wheel, because of its hardness, has a rate of stock removal at least double that of the former and will compare in general performance with the conventional rubber wheels as regards cut. However, its finish will be finer and it will not be subject to the objections to rubber wheels. In the case of both wheels cited, the temperatures of mineral as well as of the resin and mixing conditions, and the mold temperature were identical. The only variable employed was that of total weight of mix to volume, the results being two wheels alike in composition but widely different in texture, rate of cut and performance in their grinding or polishing actions.

By way of demonstration of the new properties and qualities of abrasive action which the products of the present invention possess and manifest in use, it may be pointed out that the wheels above described have been used successfully and satisfactorily at speeds of 1700 to 3700 r.p.m. and on symmetrical work and on work presenting radical contours, shapes and dimensions, and primarily for cutting by abrasive removal of stock or primarily for polishing. Moreover, they have been applied and are found adaptable to all kinds of metal surfaces, such as steel, cast iron and bronze, for example, and to non-metal surfaces, such as plastics, wood and the like.

Owing to the three-dimensional spacing of each discrete abrasive particle, spaced from adjacent particles and held, per se, occluded in a continuous, thin film of elastic bonding medium, the abrasive products of this invention have a soft feel to the touch, regardless of the high proportions of abrasive grains which they may contain. It is therefore manifest from this sensible characterization of these properties why they exhibit a new type of grinding and polishing action upon the work, unlike all of the abrasive products of the prior art. Each abrasive grain, thus mounted in a thin, elastic film is only yieldingly pressed against it, at all times, and is free to yield to such pressure in all three dimensions.

The foregoing specification constitutes the specification of my co-pending application, entitled "Abrasive Products and Method of Making," which was filed July 16, 1957, and is Patent No. 2,885,276, dated May 5, 1959, of which this application is a continuation-in-part.

It has not heretofore been contemplated nor disclosed to employ an elastomeric foaming reaction mixture as the bond for an abrasive product by adding abrasive grains to the labile, liquid reaction mixture of a synthetic elastomer, before or during the foaming reaction, so as to wet, disperse and severally adhere to and occlude such dispersed, abrasive grains within the thin, resinous, liquid films and/or in their free surfaces, as the bubbles of the foam structure are formed and before they set, thereby to acquire their elastomeric characteristics.

The compositions described and more particularly claimed in said parent application are especially suited to the manufacture of abrasive products in the form of abrasive wheels, for use in connection with machine operations involving rotary or reciprocating movements. But such compositions are also applicable for making a much wider range of forms and shapes of abrasive products, which are adaptable for other kinds of operations and by other means and in other types of holders and applications, for different functions, purposes and results accordingly.

For purposes of accomplishing the abrasive function, in which the abrasive tool is given directional movement in a single plane but in two dimensions, as in the rotation of an abrasive wheel, the cutting action of the abrasive tool and the resistance of the work are primarily opposed in the directions of their common tangents and along the radius of the wheel, from the point of contact of the wheel with the work to the center of the wheel. This is, accordingly a special relationship between the abrasive tool and the work, in operation of the abrasive function of the one upon the other, but it is probably the one most widely employed in the abrasive industry.

There are other types of abrasive action, however, in which the abrasive operation and function may be limited to a single, uni-dimensional or straight-line function, as in the cutting of a shallow groove, with an abrasive stylus or point, in a knife-like movement with a sharp edge of the abrasive tool. A triangular or rectangular stick, point, cone, cylinder or rod, or a thin sheet may be used for such a purpose. On the other hand, a three-dimensional abrasive action may be required, as by moving such a cutting point in three dimensions relative to the work. Likewise three-dimensional abrasive action is involved with work having surfaces or bodies to be operated upon, which present three-dimensional variations of shape, hardness or other properties to the abrasive tool, or other diverse characteristics, such as densities, compositions, resiliencies or yield values.

Accordingly, the abrasive products of this invention have purposes and uses other than and beyond those in which the abrasive tool takes the form of a conventional abrasive wheel, which are very important and valuable to the abrasive industry.

Generically, the present invention provides for the mounting of each individual abrasive grain firmly in an elemental elastomeric bonding medium which surrounds, wets, adheres to and occludes the same and forms thin films, of a thickness of the order of the dimensions of the abrasive grains, or less, and hence holds each grain permanently in fixed position, per se, and also relative to each of the other dispersed abrasive grains therein, but with a freedom of movement in three dimensions under stress or strain, while at the same time susceptible to complete elastic recovery and return to such initial position and relationship, as each such stress or strain is relaxed or released and directly proportional thereto.

The abrasive product or tool containing abrasive grains mounted and held in this manner may therefore be given many forms and shapes other than and in addition to those of abrasive wheels, and be otherwise used, adapted and applied to a much wider range of work accordingly, for various different abrasive functions and results.

It is an object of the present application to disclose, describe and claim such more generic as well as such more specific adaptations and applications of the invention to the abrasive industry and the variations in abrasive products, characteristics, functions, uses and results which may be obtained thereby.

There are a number of abrading operations in which, either because of the delicacy of the work involved or because of the limited space available (as in cavities and the like), it is not practical to employ a wheel. In such cases it is common to employ abrasive cloth, lapping compounds, or a bonded abrasive stick or block, rods, cylinders, cones, points, or other shapes which are especially adapted for the work in question. Some operations are more suited to one medium than are others but all have in common the necessity that the work be performed delicately, as by hand, and with an appropriate relative movement between the abrasive tool and the work, such as a reciprocating or rotary motion.

Abrasive sticks (which may have been cut from abrasive wheels, as I have described in my parent application) have proved themselves outstanding in this class of work. In the hand finishing of dies, removal of tool marks and the marks left by conventional abrasives on work (as in the lathe spindle for example), the resilient abrading characteristics of my products have been found to be of great value in obtaining desired degrees of high finish with a minimum of time. As with the abrasive wheels described, the high heat resistance of these products as well as their tendency to clear themselves automatically and continuously of swarf (and thus not to load) are characteristics which are not possessed by otherwise bonded abrasive products, whether of rubber or harder bonds.

I have found that both the process and product, as described in my parent application, are perfectly adapted to the manufacture of sheets, sticks, blocks and other abrasive shapes, generally. Thus, if molded in a shape which is relatively thin in one dimension, as, for instance, in a mold 8" x 12" in area and ½" thickness, and in a mold of this type wherein the cover is one of the large sides and the material is dispersed in this relatively shallow area before closure, a stronger and tougher product results, if the density is increased, over those densities applicable to the manufacture of wheels. Other than this difference, the process is similar to that already described in the above parent application.

The hardness, density, toughness and elasticity or resiliency, as well as the concentrations and ratios of abrasive grains to bond, may be varied in terms of the compositions used, rate of mixing, addition to the mold, temperatures and pressures employed, and the like, as set forth in my parent application, the specification of which is given above. In addition, these compositions, properties and other characteristics may be controlled and determined in the construction of a single abrasive product, as by effecting such changes during compounding, mixing, pouring, reacting, setting and pressing. Thus, the composition of the bond, the abrasive grain, catalyst, etc., may be separately prepared and filled into the mold, in a succession of modifications, one after another, while all are reactive to foam, form and set, and thus produce an integrated product of successively varying properties and abrasive characteristics. For example; laminated blocks, tiles or sheets, with flat or tapered sides, or fluted or waffle shaped plates, in which the laminae or projections are of different specific abrasive qualities and properties.

Various other shapes of abrasive tools and combinations of abrasive grains and resin compositions will appear and be employed by those skilled in the art, within the present invention, upon applying it to meet the specific needs and requriements of the industry.

For example, in applying the method of the invention to the preparation of shapes, forms and sizes of abrasive products other than abrasive wheels, abrasive blocks, sticks and the like were made, using the following composition:

219 grams resin
933 grams, No. 80 aluminum oxide abrasive grain
8 grams dimethyl-ethanolamine
8 grams morpholine These ingredients were compounded and mixed carefully and thoroughly, as previously described, and poured at room temperature into a rectangular mold 8" x 12" x ½" deep. After foaming, reacting and hardening (without superposed pressure) the shaped and set abrasive block was removed from the mold. It had a density of 24 grams per cubic inch or 1.46 grams per cubic centimeter, and had a hardness of 70 durometer on the Shore scale "A."

The thus prepared abrasive block was then cut into sticks of approximately 3" x ¾" x ½". These sticks were used to polish round, steel spindles while being rotated on a lathe, and proved to be superior in operation to the former successive uses of abrasive cloths, and resulted in producing a finish equivalent to that obtained with abrasive cloths of No. 180 abrasive grain, which is very much finer than No. 80 grain. They were also found to be superior to abrasive cloths, of the prior art generally, when used by hand to remove blemishes and scratches from small steel parts, such as, for example, in the preparation of the surfaces of such parts for the application of enamels, or like surface coatings or finishes.

My work with the subject matter of the invention has demonstrated that an abrasive article employing a backing chosen from the class of paper, textiles, both woven and unwoven, or vulcanized, which has been surface coated with a reactive combination of polyurethane-foaming resins and abrasive mineral grains, yields a new abrasive article of practical value, possessing qualities and attributes not heretofore known. In brief, by utilizing the bonding, cushioning, elasticity and elastomeric recovery action inherent in foamed polyurethane resins, in accordance with my invention, there results an abrasive material which may be used as a sheet, disc, belt or like abrasive product, with corresponding characteristics and utilities accordingly.

This material then possesses the same capabilities of producing fine finishes and the other advantages accruing from its use in the form of abrasive wheels, as I have described, except that added versatility is achieved and the material is then adaptable for use in the same forms as are usual coated abrasives of the prior art, supplemented by these improvements of form, operation, adaptability, functions and results.

As is the case in the manufacture of abrasive wheels, the processes that I have developed permit the use of pressures, both self-contained and external, for there are many usages that require a product whose density is in excess of that which can be achieved by allowing the reactive foam to expand at will.

But such pressures are not so great as to prevent all foaming of the resin mixture and/or concomitant formation of bubbles. Although this would be possible it would not be desirable for effecting the objectives, purposes and results of the present invention. Neither are such pressures applied to the reaction mixture at any time in such a way as to expel the gases or bubbles already formed by the foaming reaction as would be effected by heavy or repeated milling operations, commonly used in the mixing, sheeting out or molding of rubber compositions, for example.

Due to the high reactivity in the resin mixture which ensues once the catalyst has been incorporated, it is not feasible to apply the adhesive coating from rolls, as is customary in the manufacture of conventional coated abrasive materials. However, in other respects the process is somewhat similar, especially as regards the distribution of mineral abrasive grains, or of the reactive resin and abrasive grain mixture, on the backing sheet.

My process utilizes conventional abrasive coating machine parts, such as reel-off, tension and guide devices, print press, controllable feed and hopper, and reel-up machine. Other parts, such as the run-out belts and spray nozzles are common to the foam manufacturing industries.

Apparatus suitable for carrying out the operations of the present invention is illustrated in the accompanying drawings, in which.

In practice (referring to Fig. 5), the endless web of sheet backing material 1 is led from the reel-off 2, against the tension of a brake 3, into a horizontal position, with the surface 4, which is to be coated, up. It first passes over a support 5, in the position where it is to receive the resin composition, as from thes upply tank 6. This may be filled and kept replenished with the components of the reaction mixture, through feed lines 7 and 8, under pressure, if desired. A mixing device will be mounted in the tank 6 (not shown) and a mixing or spray nozzle or head 9 may also be provided at the exit 10 which is directed downwardly upon the surface 4 of the sheet material 1. The whole tank 6 and associated parts may be traversed crosswise of the strand of sheet material 1, to distribute the foaming resin composition, or the spray nozzle or head 9, may be traversed alone in this manner. In large scale operations or upon narrow sheet materials, the exit 10 of the mixing head may be sufficient to span the width of the sheet backing material.

Figure 5:
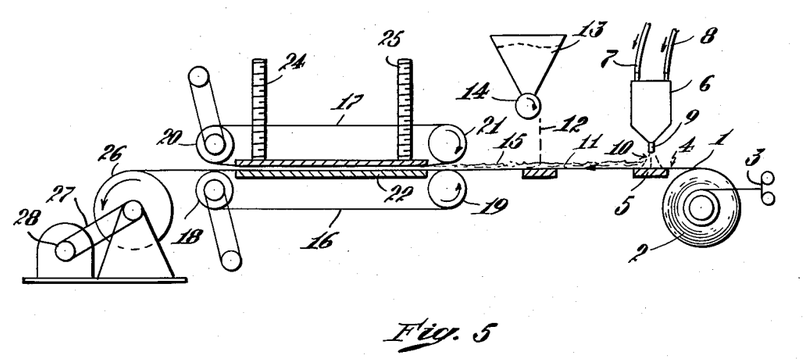
Fig. 5 is a side elevation of apparatus for applying the reactive resin composition and abrasive grain upon a horizontally traversed backing sheet and reducing the thus applied coating to a predetermined uniform thickness.

Spray heads of this type are commonly known and used in the industry to lay down foams and the resin pre-polymer and catalyst are fed to it from the supply tank 6, preferably under variable, controlled pressures so as to mix thoroughly and in the correct proportions. It may also be metered by control of the outlet 10, so as to provide the correct amount and distribution of the resin bond composition 11 which is required on the sheet.

The amount of foaming resin laid on the web is controlled, therefore, as is also the speed of such web or backing sheet. Also controlled as to amount is the abrasive grain, which is spread or dropped by conventional methods and apparatus, thereon. In fact, the timing of web speed is made in relation to the rate of growth of foam on the web. To this end, the foam coating 11 passes under the mineral curtain 12 from the supply tank of abrasive grain 13, governed by a rotary feeder 14, at the correct moment as regards the reacting foam to form a layer 15. I have found that if the abrasive is deposited on the foam coat before the catalytic action has had time to get started, the mineral deposit 15 will inhibit the further progress of the reaction and there will be an insufficient volume of foam to receive and carry the desired mineral weight. Conversely, if the mineral deposit is retarded and the foaming action is allowed to proceed too far before deposit of the mineral, a non-uniform structure will result and the mineral will not be well dispersed. In this event, there will be little mineral close to the fabric or backing and a greater concentration at the top or free surface of the structure. This may be desired, but if not, suitable adjustments may be easily and quickly made by control of the reaction rate, and speed of travel of the web, both in relation to the time or distance between the point at which the foam is spread and the point at which the mineral is applied, temperatures of each and proportionate amounts used.

Following the application of the reactive resinous foam and of the mineral abrasive grains to the web, the thus coated web is then, and while still travelling, subjected to pressure, so as to densify the composition. This process may also include the application of heat, in various forms, to complete the reaction and control the speed and degree of setting of the material.

I accomplish these effects and results by the use of travelling belts of steel 16 and 17, passing over rollers 18, 19, and 20, 21, respectively. The belts permit accurate dimensional control of the thickness of the abrasive sheet material to be made. By the belt method it is also possible to achieve the desired density, either by fixing the aperture between the belts (and thus the final thickness and density) or also by varying the aperture, that is, decreasing the distance between the belts so that the material is progressively densified as the material reacts, foams and then sets, to permanent dimensions.

This may be done with the apparatus shown in Fig. 5, by supporting the upper pass of the lower belt 16, upon a horizontal platen 22, and by providing an upper platen 23 upon the lower pass of the upper belt 17. The upper platen 23 may rest of its own weight upon the belt, but additional pressure and also direct control of the spacing between the horizontal passes of the belts 16 and 17 may be provided, as by screw threaded posts 24, 25, or the like. In this way the belts may be held parallel at any predetermined degree of spacing to receive, restrain and press the coated sheet material therebetween, or, the screw 25 may be slightly elevated so as to permit the lower horizontal pass of the upper belt 17 to ride higher at the entrance end, than the screw 24 permits at the exit end, thereby to provide a gradually narrowing aperture between the belts and increasing pressure upon the sheet and abrasive-resin composition thereon.

Upon coming from between the belts 16, 17, the abrasive-coated sheet is fed to the take-up reel 26, which may be driven by a belt 27 from the motor 28.

The alternate method of drum drying is not so versatile as regards control of pressures but is more economical as regards equipment and necessary space. In using this method, the backing material 31 (Fig. 6) is drawn from a reel-off, 32, under tension provided by the brake 33, into a horizontal position, with the surface 34, which is to be coated, up. The sheet may be passed over a horizontal support 35, at the point where the reactive resin composition is to be applied to it. As in the apparatus shown in Fig. 5, the supply of resin composition may be contained in the tank 36, to which the ingredients of the reactive resin mixture are delivered at the desired temperatures and in the required proportions, through the lines 37 and 38, and under pressure, if desired. The tank will be provided with suitable mixing devices therein (not shown) and with a spray nozzle or mixing head 39, at the outlet 40, which is directed downwardly upon the surface 34 of the sheet 31. In this apparatus, also, the tank 36 as a whole or the spray nozzle 39, may be so mounted as to traverse crosswise of the sheet 31, or be made of sufficient width to correspond to the width of the sheet or of the deposit of resin-bond composition desired thereon, in order to assure uniform distribution. The outlet 40 may be so controlled or metered as to regulate the amount and depth of the deposited layer 41 of the reactive, resin-bonding composition upon the sheet backing material.

Figure 6:
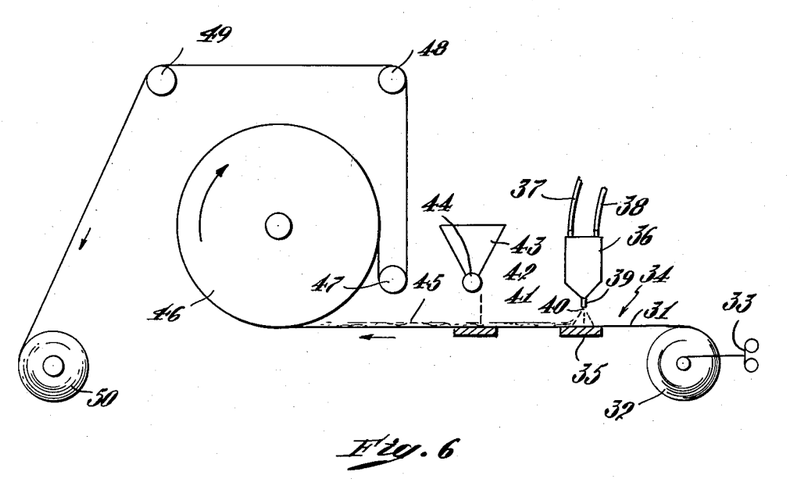
Fig. 6 is a similar side elevation of apparatus for applying the reactive resin composition and abrasive grain upon a horizontally traversed backing sheet and then passing it over a heated drum to compress, shape and heat the coating thus applied.

A shower or curtain of abrasive grain 42 of the desired size or range of sizes, is delivered upon the layer 41 of reactive resin bond, from the tank 43, under controlled distribution of the rotary feeder 44.

The backing sheet 31, with its surface 34, carrying the layer 41 of reactive resin bonding composition and abrasive grain 45, is next led with its coated face upward under and against the drum 46, which rotates in the direction of the arrow and may be heated internally by steam (not shown) or not, as desired or required by the composition used and the degree of development of the resin. The sheet 31 is drawn over and against the surface of the drum under its own tension, and thence beneath guide roller 47 upwardly over guide rollers 48, 49, and to the reel-up 50.

In carrying out the coating aspect of the present invention, with either the belt method or drum method of application to the backing sheet, the reactive resin-abrasive grain composition is bonded to a flexible cloth backing by means of a polyester modified by a di-isocyanate, and catalyst, as disclosed and described in the specification of my parent application, as presented above.

Thus, cotton cloth drill, 28½ inches in width and finished as is common practice in the abrasives industry (that is, having been washed and stretched and then treated on the back with either animal glue or synthetic resin so as to give stability and tensile strength as required for abrasive belt operations) is used as the backing material. This material has a weight of about 22.5 pounds per sandpaper ream. (That is, a sheet or sheets having a total area of 47,520 square inches.)

The backing sheet is threaded into and through the machine, as illustrated in Fig. 5 or Fig. 6, as the case may be, so that the subsequent coating will be applied to the "square" side of the cloth. When the rest of the apparatus is in readiness, as shown and described above, and supplied with the reactive resin bonding composition and abrasive grain, the backing is pulled through the machine at a constant rate of speed. This rate of speed is keyed to correspond to the reactivity and rate of foaming of the reactive resin bonding mixture, as well as to its time period of setting and also to its relation to the length of the area of coated backing material in which the desired degree of setting is to take place.

By the use of auxiliary heating units, for applying heat to the coated backing sheet, as shown in Figs. 5 and 6, immediately after coating, a set state of sufficient foaming characteristics and firmness to permit of compressing or rolling the coated goods, as the case may be, may be achieved in about 90 seconds, when either contained or applied pressure is to be employed. A time interval of the order of 90 seconds, therefore, is allowed for in the machine. This time interval is related to the length of travel of the backing web and resin-bond and abrasive coating composition, from the spreading of the foaming resin mixture (and abrasive grain) to the point of entry between the confining belts 16, 17, (Fig. 5) or upon the drum 46 (Fig. 6), and travel therethrough and emergence therefrom, for winding up as a finished web of abrasive coated sheet material.

For example, in a machine having a length of 20 feet from the point of resin deposition to the wind-up, a speed of 13.3 feet per minute would be indicated.

As the goods are thus unwound and pulled through the machine, the traversing spray head or mixing nozzle applies to the sheet a mixture of 57.3 pounds of a reactive resin bond mixture as described, plus 2.18 pounds of dimethyl-ethanolamine and 2.18 pounds of morpholine, as catalysts, per sandpaper ream. Abrasive grain material, such as aluminum oxide grain, No. 80, is then deposited upon the coating of resin bond, which has started to foam, at a rate of 229.3 pounds of abrasive, per sandpaper ream.

The thus coated backing sheet or web continues to move, either into the aperture between the two steel belts 16, 17 (Fig. 5) or into the drum, where compressions and setting ensue.

The product as thus made, after final curing, will have a coating of foamed elastomeric resin and mineral about ⅛" in thickness and weighing approximately 291 pounds, to the sandpaper ream. Hardness of the abrasive coating itself is approximately 60 durometer on the Shore scale "A." This is somewhat softer than an abrasive wheel having a 1" peripheral face made as described in the parent application, using the same proportions. This softer result is due in part to the lesser thickness of the deposited layer of reactive resin bond and abrasive grain upon the backing sheet and in part to the differences in the process, as applied thereto.

Such a sheet abrasive product, although relatively bulky and for this reason seemingly stiff as compared to the conventional coated abrasives of the prior art, is nevertheless sufficiently flexible to be suitable for use in the form of endless belts, discs and the like, all of which are common in the field of coated abrasives. But, owing to the foam structure of the bond holding the abrasive grains in such sheets, they are capable of yielding in three dimensions, under stresses and strains of operation, and of recovery to their original status and relationships, one to another and to the backing sheet, as each of these stresses and/or strains, is diminished or released.

A sheet abrasive product, made as described, will thus exhibit the same generic characteristics in the belt or disc as are obtained in the use of abrasive wheels as described and claimed in the parent application, such as rapid attainment of high finishes without undue loading or clogging, but with the additional characteristics of light pressures of contact, yield, speed, etc., and large surface areas of work to be operated upon, incident to sheet abrasive products of this kind, compared to molded abrasive wheels or shapes.

It is to be understood that the above descriptions are essentially general in type, and that to those skilled in the art it will be obvious that many variations and embellishments along these lines will occur, and that the examples given are illustrative only as typically representative methods by which the foam in resin bonding mixture and abrasive grain may be combined and applied to a continuous web.

As briefly described in my parent application as filed, I have found that the addition of vegetable or certain synthetic fibers which are chemically inert, to the reaction mixture, serves to strengthen the tensile strength and toughness of the wheel or other shape, so as to resist high peripheral speeds or to resist rupture and breakage, in the case of sticks, blocks, sheets and the like, when bending forces are applied or involved.

The use of flock or fibers in compositions is well known as a reinforcing agent to strengthen or stiffen such materials. However, in conjunction with my abrasive composition, the preservation of the properties of the elastomeric foam structure of the bond and retention of the abrasive grain impose requisite considerations, accordingly. Consequently, there are certain limitations as to choice of fiber, to be used, as above indicated, and also as to fiber size. As explained in the original application, care is taken in the formulation to produce an object of desired hardness or degree of elasticity and resilience. Therefore, the properties and amount of fibers and type used must be such as not to obstruct achievement of the desired hardness, elasticity, or resiliency. The fibers I use may be prepared from any of the conventional vegetable types, such as cotton, sisal, hemp, tampico, ramie, etc. or rayons, nylon or polyester, chosen from the synthetic group, as well as steel, aluminum or glass, from the inorganic fibrous materials. In general, however, the use of aluminum and steel, and in some cases, glass, are restricted to compositions of abrasive properties wherein the work is such that the abrasive or cutting effect of the fiber itself does not become a factor in the obtainment of the desired finish on the work. Also, certain thicknesses of the vegetable fibers may prove too abrasive, of themselves, to be beneficial for certain soft surfacing. Ramie and tampico and sisal fibers fall in the class of being abradant or burnishing, in and of themselves, and in fact show excellent properties when bonded in and by the elastomeric resin matrix alone, as well as with hard abrasive mineral grains.

It is to be emphasized that my use of flock or fibers in conjunction with a foam composition bonded abrasive wheel or other shape, differs from the prior art, in that I use the flock in an elastomeric, reactive foam, as opposed to a dense formation of gum or the like, and that the purpose of the fiber is to serve purely as a mechanical modification of such structure, for improvement of its abrasive characteristics and function, and not as a chemical modification of the bond. The latter result occurs when certain of the polyamide fibers are employed which are chemically active to combine with and enter into the chemical composition of the product.

For my best results I employ fibers from 3/16" in length to 3/4" in length and in diameter no less than 3 denier, or its equivalent in natural fibers, up to 60 deniers.

The method of introduction of the fibers to the mixture which I employ may be by pre-mixing the fibers with the resin or resin components, prior to the addition of the catalyst and/or abrasive, so that in effect the fibers are pre-wet by the resin before the foam reaction stage, or the fibers may be pre-mixed with the abrasive material so that both the fibers and abrasive grains are introduced to the resin at the same time. However, they may be added after foaming has commenced, or in other different orders of procedure to effect specific purposes or results.

The amount of fiber that is employed is controlled by the surface area of the fibers—which area must be not in excess of the ability of the foam, under the circumstances of addition and mixing or in its final form, to wet and cover the entire fiber component—and also by the absorbency of the fibers, which also affects the wetting rates as well as the ultimate wetting capacity of a given quantity of the reagent mixture; moreover, the percentage of fibers used must be controlled in relation to the amount of mineral abrasive grains and fibers which are also to be wet and bonded by the labile reactive resin component.

Practically, I have found that for preferred effects and results, a lower limit of 1/2 of 1% by weight of fibers relative to weight of bond (for a 3 denier, 3/16" rayon flock) up to 35% of a coarse sisal fiber of 50 denier and 1/2" in length may advantageously be observed.

Thus, in making wheels, blocks, strips, sheets or other shapes of my abrasive products (or coated abrasive materials) with the incorporation of fibers, I prepare a composition, for example, of the following formula:

229 grams resin
915 grams No. 80 aluminum oxide abrasive grain
9 grams dimethyl-ethanolamine
8 grams morpholine
11½ grams sisal fibers of about 3/8" in length The sisal fibers are mixed into the resin and dispersed until completely wet. The other ingredients were then added and thoroughly mixed in and uniformly dispersed in accordance with the usual procedures, as previously described. The reactive, resin mixture is then poured into the desired mold, or otherwise shaped, for the purpose which the product is intended to serve. In this instance, for example, in order to facilitate the making of subsequent centrifugal tensile strength tests, I used a cylindrical mold and hence fashioned the reactive mixture in the form of an abrasive wheel. This was 8" in diameter with a 1" peripheral face and had a density of 22 grams per cubic inch or 1.34 grams per cubic centimeter. After pouring, foaming, forming and hardening, the thus finished abrasive wheel gave a durometer reading of 72 on the Shore scale "A."

Similar abrasive wheels, made for direct comparison with these, otherwise exactly the same, but without the addition of any fibers, upon being subjected to centrifugal tensile strength tests, ruptured at an average speed of 3100 revolutions per minute. But the abrasive wheels thus made, with the incorporation of fibers, as described above, with sisal fibers therein, ruptured only at an average speed of 3700 revolutions per minute. Aside from these tensile strength test results, however, there was no discernible difference in appearance, or other physical or operational properties of the two types of wheels, nor in the abrasive results or the finish that the different wheels produced.

Another set of wheels, made with the same formulation, except that 1% to 3% of rayon fibers of about 3/16" in length and 3 to 10 denier in diameter, were used, showed similar increases in centrifugal tensile strength tests. For example, 219 grams resin
932 grams No. 80 aluminum oxide abrasive grain
8 grams dimethyl-ethanolamine
8 grams morpholine
4.5 grams rayon fibers of about 3/8" in length and 5 denier diameter For the preparation of this type of fiber-bonded abrasive products, in the form of blocks, sticks, sheets, coated abrasive materials, and so on, the rayon fibers, for example, may be tumbled to loosen them up and then mingled with the abrasive grains, previous to their addition to the resin, followed by mixing, reacting, foaming and forming, as by pouring into molds, sheeting out or the like, as previously described, as, for example, into the rectangular shallow mold 8" x 12" x ½" deep. Upon setting the block was removed and cut into strips 3" x ¾" x ½". There was no difference in the physical characteristics and appearance of these sticks from those described above, without the addition of fibers, except that in use it was found that they had somewhat greater flexural resistance than the sticks similarly made, but without the fiber additions.

I claim:

1. A coated abrasive having a backing with a foamed structure coating thereon, said coating being densified by pressure to a density of at least .439 gram per cubic centimeter, said coating being characterized by a foam structure of thin elastic films and discrete abrasive grains dispersed therethrough, severally embedded in and retained by said films of the elastic solid as a continuous elastic bond, the weight of said grains being at least equal to the weight of said elastic bond, the said foam structure comprising the foamed reaction product of reagents of the class consisting of aliphatic polyesters and polyethers, with isocyanates, reacted to polymerize and form elastomers as the said bond.

2. A coated abrasive according to claim 1 in which the ratio of weight of said grain to said elastic bond is between 1:1 and 7:1.

3. A coated abrasive according to claim 1 wherein the density of the coating is at least about 1.34 gram per cubic centimeter.

4. A coated abrasive according to claim 3 in which the ratio of weight of said grain to said elastic bond is between 1:1 and 4.26:1.

5. The method of forming a backed coated abrasive comprising the steps of mixing reagents of the class consisting of aliphatic polyesters and polyethers and isocyanates, reactive to polymerize and form elastomers and to foam, with a catalyst of said reactants, dispersing abrasive grains in the reactant and foaming mixture and reacting under conditions of temperature of about 20° F. to 150° F. applying said mixture to a backing, confining the mixture and backing between surfaces to give it final shape and curing and developing a internal pressure up to about 30 pounds per square inch above atmospheric pressure to promote and control the reaction and to shape the reactant mixture, the density of said coating being at least about .439 gram per cubic centimeter and the weight of said grains being at least equal to the weight of said elastic bond.

6. The method of forming a backed coated abrasive as in claim 5 wherein the ratio of the weight of said grains to said elastic bond is between about 1:1 to 7:1.

7. An abrasive tool densified by pressure to a density of at least about .439 gram per cubic centimeter, said tool being characterized by a foam structure of thin elastic films, discrete abrasive grains and reinforcing fibers dispersed therethrough, severally embedded in and retained by said films of the elastic solid as a continuous elastic bond, the weight of said grains being at least equal to the weight of said elastic bond and said fibers being present in a quantity relative to weight of bond of from ½ to 3%, the said foam structure comprising the foamed reaction product of reagents of the class consisting of aliphatic polyesters and polyethers, with isocyanates, reacted to polymerize and form elastomers as the said bond.

8. An abrasive tool according to claim 7 in which the fibers are of a length from 3/16 to 3/8 of an inch.

References Cited in the file of this patent

UNITED STATES PATENTS

| | | |
|---|---|---|
| 716,422 | Hoppe et al. | Oct. 6, 1954 |
| 2,881,065 | Reuter | Apr. 7, 1959 |
| 2,885,276 | Upton | May 5, 1959 |